No. 763,858. PATENTED JUNE 28, 1904.
W. L. CROWSON.
COTTON SEED SEPARATOR AND CLEANER.
APPLICATION FILED APR. 25, 1903.
NO MODEL. 4 SHEETS—SHEET 1.
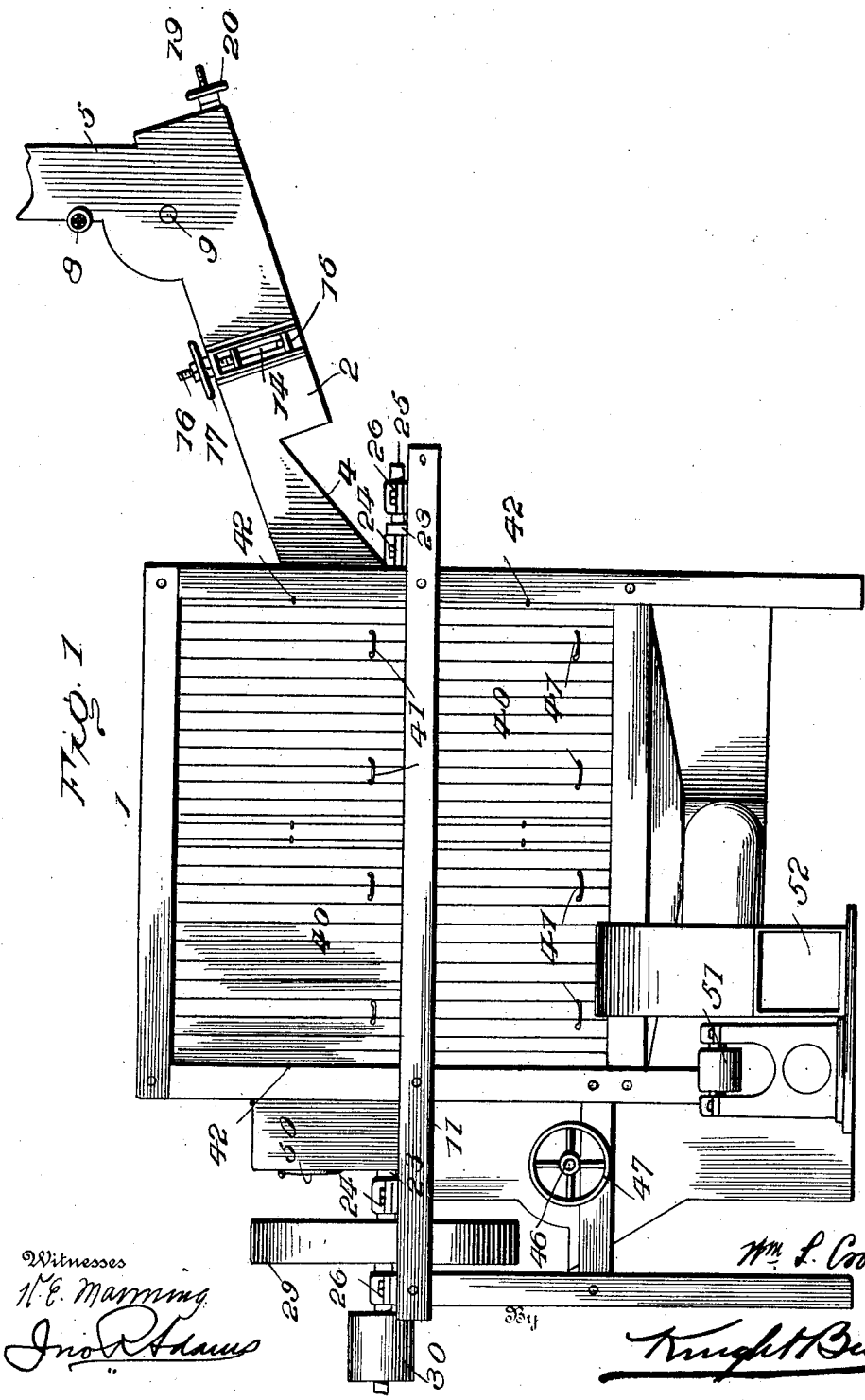

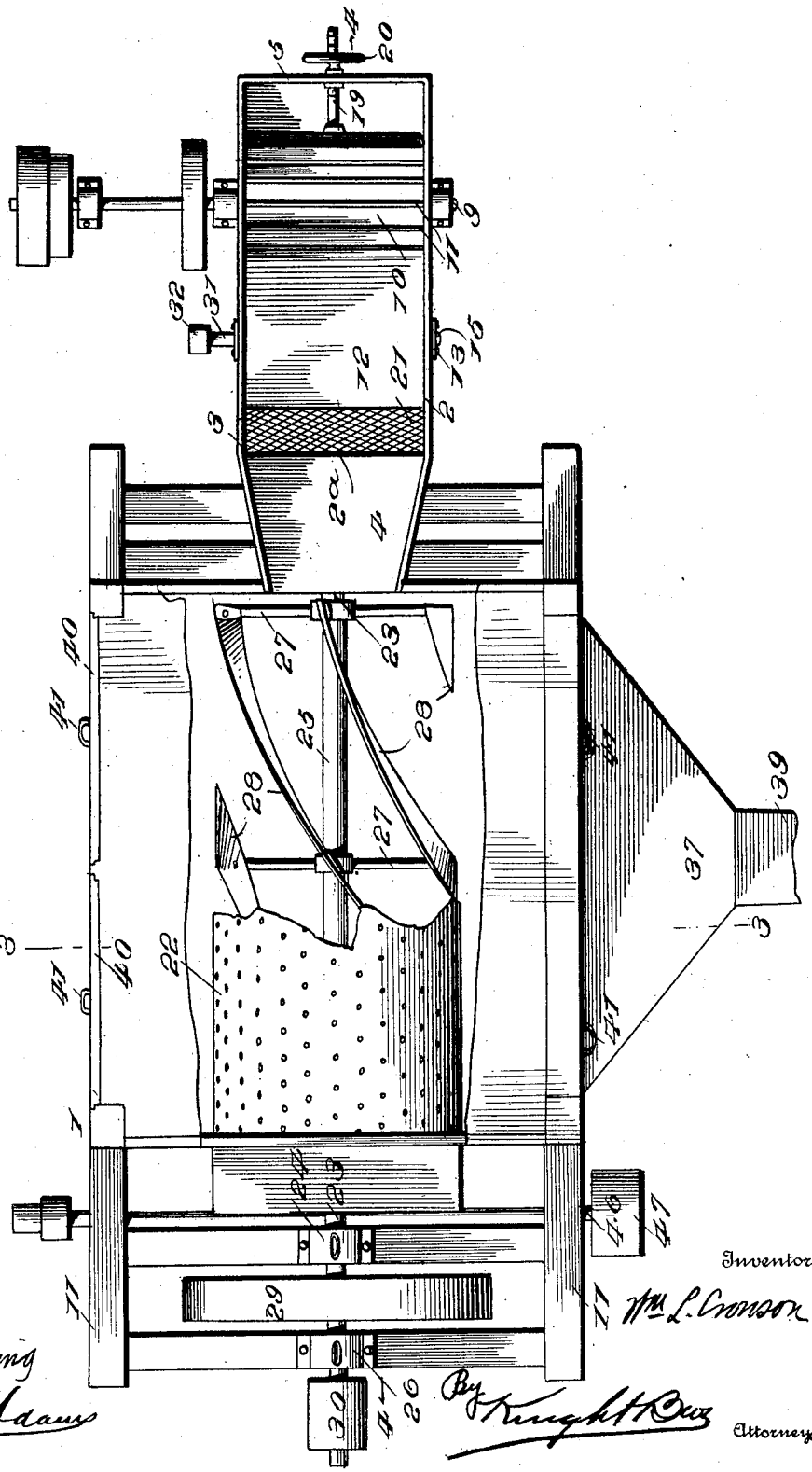

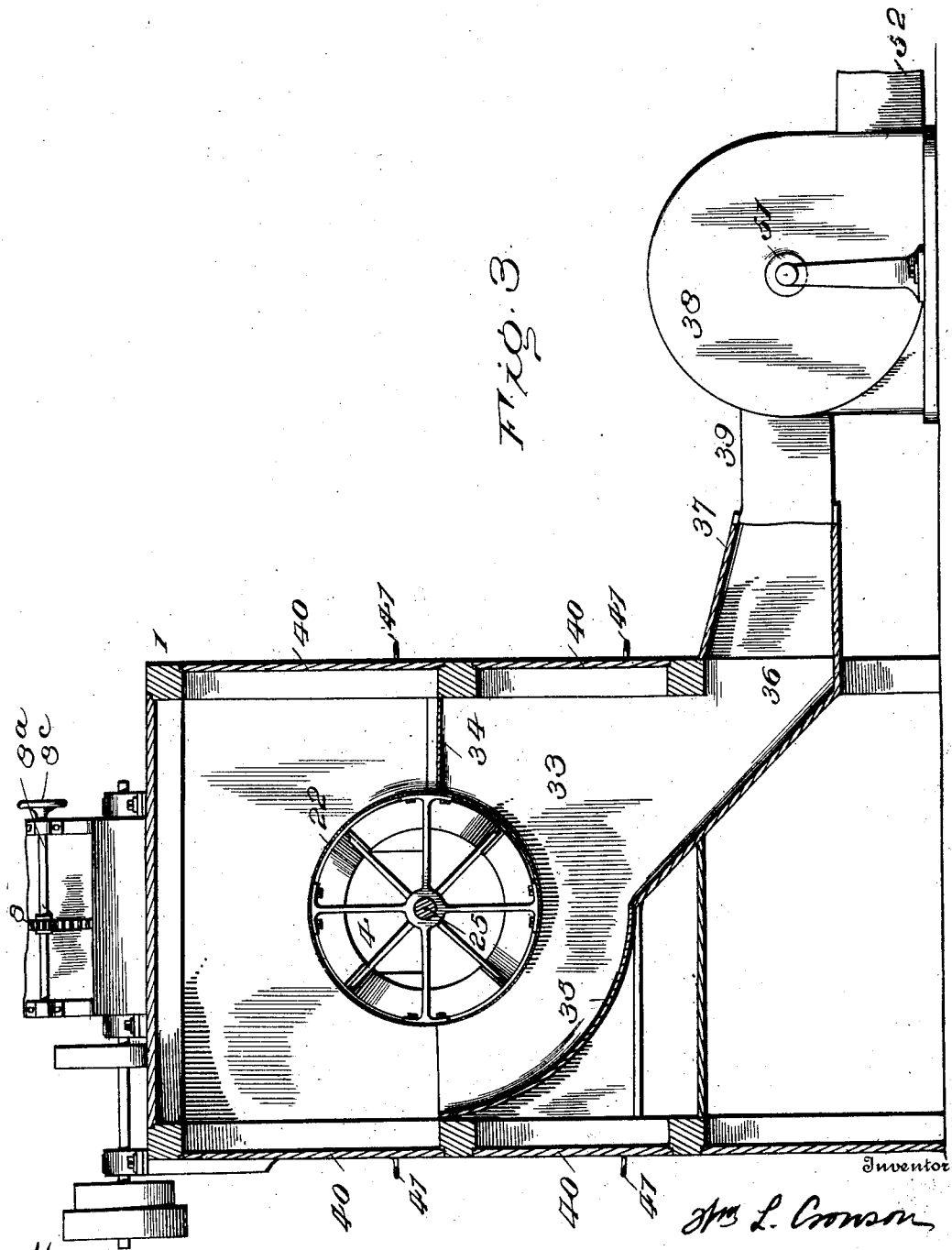

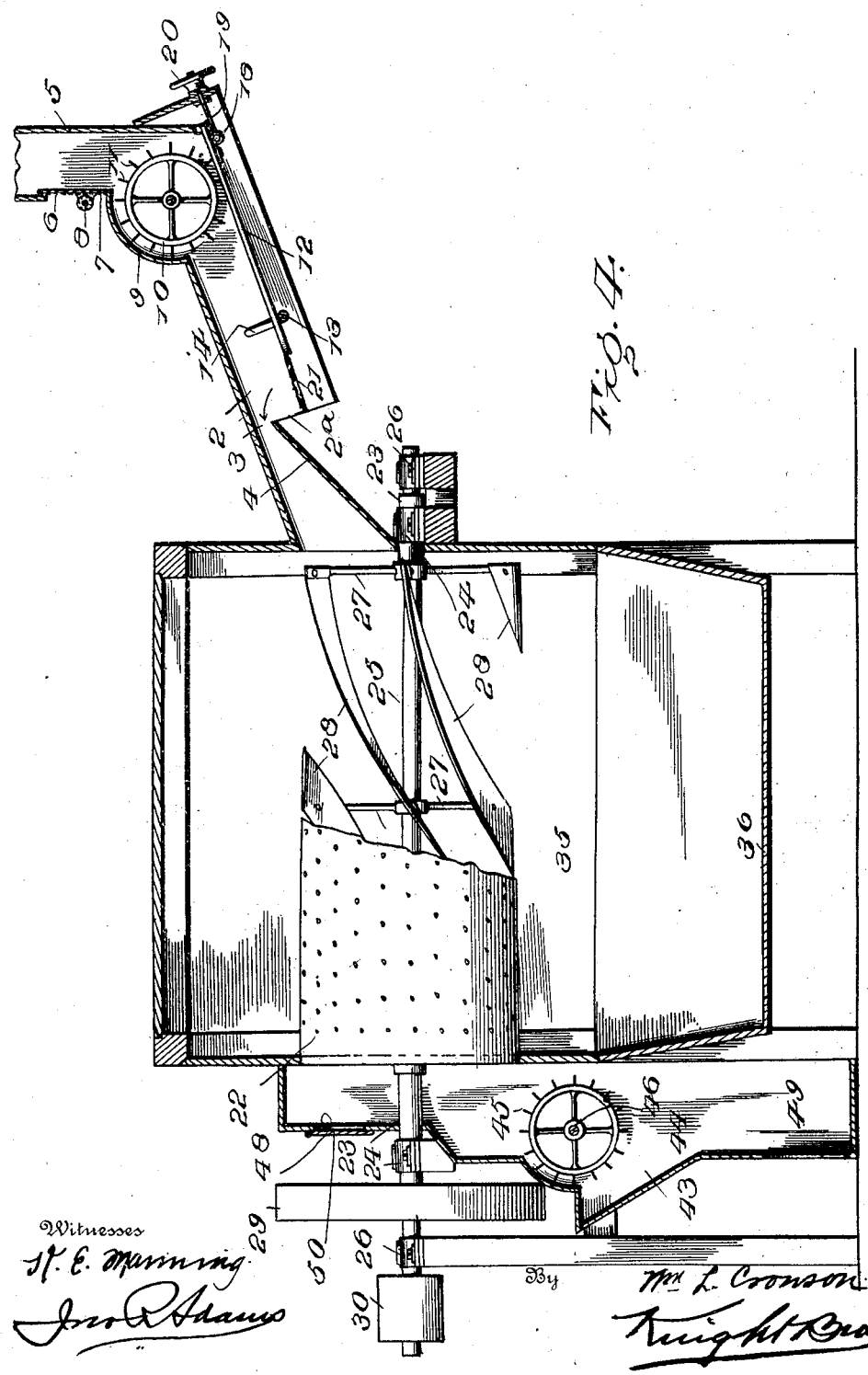

No. 763,858. Patented June 28, 1904.

UNITED STATES PATENT OFFICE.

WILLIAM L. CROWSON, OF MEMPHIS, TENNESSEE.

COTTON-SEED SEPARATOR AND CLEANER.

SPECIFICATION forming part of Letters Patent No. 763,858, dated June 28, 1904.

Application filed April 25, 1903. Serial No. 154,297. (No model.)

*To all whom it may concern:*

Be it known that I, WILLIAM L. CROWSON, a citizen of the United States, residing at Memphis, in the county of Shelby and State of Tennessee, have invented certain new and useful Improvements in Cotton-Seed Separators and Cleaners, of which the following is a specification.

In the drawings, Figure 1 is a front elevation of my improved machine. Fig. 2 is a top plan view of my machine, parts being broken away. Fig. 3 is a vertical section on the line 3 3, Fig. 2. Fig. 4 is a vertical section on the line 4 4, Fig. 2.

Cotton-seed when delivered from the country gin-houses to the oil-mills is found to contain many foreign substances—such as nails, stone pebbles, bits of wood, leather, and a variety of other small things—and also a large amount of dust and dirt. It is absolutely necessary that these foreign substances be gotten rid of before the seed can enter the linters, so as to save the gin from destruction. Magnets have been used to eliminate the nails and other metallic substances from the seeds; but they fail to remove the other foreign matter, whereas it is the object of my invention to provide a machine of this character to eliminate all foreign substances and at the same time to clear the seed from dirt and dust, thereby rendering the cotten-seed into a clean and perfect condition before entering the linters.

1 is a rectangular chamber in which is contained the apparatus for cleaning the seed, into which the feeding conduit or chute 2 leads, said conduit having a contracted throat formed by a portion 4 of the bottom of the chute set at an acute angle adjacent the casing 1. Connected to the outer end of the chute or conduit is a hopper 5, in which is mounted a discharge-slide 6, provided with a rack 7, with which the pinion 8 is adapted to engage. At a juncture of the hopper 5 and the feed conduit or chute 3 the conduit is enlarged, as at 9, and in said enlarged portion is suitably journaled a feed-roller 10, on the periphery of which are disposed a series of radial blades 11, toward which the discharge-slide 6 may be adjusted.

12 is a flat board apron, preferably faced with sheet metal, the forward end of which is mounted upon a shaft 31, extending across the conduit 3, the ends of said shaft extending through elongated slots 14 in the side of the conduit and mounted in adjustable brackets 15, secured upon the outside of the conduit, said brackets being mounted upon screw-shafts 16, upon which is mounted an adjusting wheel or nut 17, as clearly shown in Fig. 1, whereby the floating end of the vibrating apron-board 12 may be raised or lowered to the desired position. The rear end of the vibrating apron 12 is mounted upon hinged joint 18, from which extends a stem 19, passing through the end of the feed-conduit and provided at its outward end with an adjusting-wheel 20, provided with screw-threads which are adapted to intermesh with screw-threads on the stem 19. By this means the length of the apron within the feed-conduit may be regulated.

21 is a screen projecting from the forward end of the apron 12 and secured thereto.

Within the casing 1 is positioned a revoluble perforated metal-plate cylinder 22, said cylinder being mounted upon hollow shafts 23, journaled in bearings 24 upon the outside of the casing.

25 is a shaft journaled in the bearings 26 on the outside of the casing, said shaft passing loosely through the hollow shafts 23 of the perforated metal-plate cylinder 22.

27 represents the spiders mounted upon the shaft 25, to the ends of which is connected a four-bladed spiral agitator 28, said spiral agitator being revolubly mounted within the perforated metal-plate cylinder 22, as clearly shown in Figs. 2, 3, and 4.

29 is a band-pulley mounted upon the hollow shaft of the perforated metal-plate cylinder 22 to operate said cylinder at about twenty revolutions to the minute.

30 is a band-pulley keyed to the shaft of the spiral agitator 28, geared to a speed of about four hundred revolutions to the minute. The shaft 31 has a suitable band-pulley 32 and carries a cam 31$^a$, positioned in engagement with the vibrating apron 12, whereby said apron is vibrated during the operation of the machine.

33 is an exhaust-chamber provided with a stop-plate 34.

35 is a curved plate secured in one corner of the exhaust-chamber to prevent dust, &c., accumulating on the bottom of the exhaust-chamber.

36 is the exit from the exhaust-chamber for the dust and dirt, communicating with gradually-tapered outlet 37, leading into the exhaust fan or blower 38 by means of a throat 39.

40 represents removable panels secured in one side of the chamber 1, to be hereinafter referred to, said panels having suitable handles 41 and held in position by means of buttons 42.

43 is a fixed casing secured to one side of the chamber 1, in which is mounted a feed-roller 44, having radial blades 45 and mounted upon a shaft 46, said shaft having a suitable band-pulley 47 keyed thereto. In the upper end of this casing I form an opening 48, which forms an air-supply inlet at the top of the said casing to be hereinafter more fully referred to. The feed-roller 44 is mounted immediately below an opening in one side of the chamber 1, said opening registering with the open end of the perforated metal-plate cylinder 22.

49 is an opening at the bottom of the casing 43, through which the clean cotton-seed passes from the machine. The opening 48 in the top of the casing is provided with a suitable trap-door 50.

51 is a suitable band-pulley connected with the shaft of the exhaust fan or blower, and 52 is the opening of said blower.

The operation of my improved machine is as follows: The cotton-seed enters the hopper 5 by downfeed from the storage for cotton-seed above the same, the flow of the seed being regulated by means of the discharge sliding feed-regulator 6, which is operated by means of the rack and pinion 7 and 8, while the flow of the seed is again regulated by the feed-roller 10 at the bottom of the hopper 5, the speed of the roller 10 regulating the flow of the seed downward to and from the vibrating apron 12. This apron is composed, as stated, of a flat board with a sheet-metal surface, hinged at one end to the regulating screw or stem 19. The object of the regulating-screw is to regulate the opening or mouth at the free end of the board, to which is secured the wire screen 21 and through which by the exhaust from the fan 38 through the chamber 1 the air is drawn up, causing the cotton-seed to fly up and follow the current of air (indicated by an arrow) through the contracted throat 3 of the conduit into the perforated metal cylinder 22. The heavy substances not acted upon by this exhaust current of air are driven out at the opening 2ª between the contracted throat 3 and the screen 31 by the vibration of the apron 12, the vibration of the apron being accomplished by a small shaft with a cam attachment operated by the band-pulley 32. The inclination of the apron to the cam-shaft is effected by the sliding brackets 15 on either side of the conduit 2. The object of having the apron to vibrate is to separate the seed from the foreign substances, allowing the seed to be drawn up from the same by the exhaust current of air and by this vibration shake out the foreign substances through the opening 28. As soon as the cotton-seed is drawn into the perforated metal drum 22 by the exhaust current of air it is agitated and stirred therein by the spiral metal agitator-plates 28, the perforated metal drum 22 rotating at a speed of twenty revolutions to the minute, while the spiral metal agitator-plates 28 rotate at a speed of about four hundred revolutions to the minute. The agitation of the cotton, both by the drum and by the spiral plates 28, shakes the seed and beats out all the dust, dirt, and motes, which by the action of the air are drawn out of the drum through the perforations therein into the exhaust-chamber 33 and out of the exhaust-chamber through the exhaust fan or blower to a dust-bin. (Not shown.)

The movable panels 40 are provided simply to facilitate the examination of the interior of the exhaust-chamber and for cleaning out of the same and for necessary repairs.

The trap-door 50 (shown in Fig. 4) is for the purpose of admitting air into the exhaust-chamber when it is found that the exhaust is too great, so as to temper the same to a proper degree of exhaustion.

The feed-roller 44 in the casing or exit-shaft 43 is adapted to precipitate the outgoing cotton-seed received in the said exit-shaft from the perforated cylinder 22 and to insure the flow of said seed being continuous and to prevent the admission of air into the exhaust-chamber from the down-chute of the same.

The object of the stop-plate 34 (shown in Fig. 3) is to intercept the exhaust current of air, so as to prevent a circular motion of air around the perforated metal drum. This plane makes the exhaust current of air act directly through the perforated metal drum 32.

The machine is provided with a series of band-pulleys, as shown in the several figures of the drawings.

It will be seen that nothing but the cotton-seed enters the perforated cylinder 22, as the heavy foreign substances pass out by their own gravity and fall from the machine over the end of the screen 21, while the cotton-seed, being of lightest specific gravity, is freed from the substances and by the exhaust current is carried through the contracted throat into the cylinder 22.

If it is desired to diminish the feed to the feed-roller, the adjustable gate or slide 6 is lowered nearer the path of the radial plates 11 by revolving the shaft 8ª by means of the band 8ᶜ, the pinion 8 being mounted upon said shaft.

Having thus described my invention, the following is what I claim as new therein:

1. In a cotton-seed cleaner, the combination with the chute, of a roller mounted in the feed-opening of the chute for feeding cotton-seed into the chute and preventing the entrance of air through the feed-opening, said chute being provided with another opening and closed from its feed-opening to the second opening, a throat positioned above said opening, a perforated cylinder receiving the cotton-seed from the chute, and means for causing a blast of air to pass from the opening in the chute through the throat above and through the perforations in the cylinder.

2. In a cotton-seed cleaner the combination with the chute, of a roller mounted in the feed-opening of the chute for feeding cotton-seed into the chute and preventing the entrance of air through the feed-opening, said chute being provided with another opening and closed from its feed-opening to the second opening, an agitator positioned between the feeding-roller and the opening in the chute, a throat positioned above said opening, a perforated cylinder receiving the cotton-seed from the chute, and means for causing a blast of air to pass from the opening in the chute, through the throat above and through the perforations in the cylinder.

3. In a cotton-seed cleaner, the combination with the chute, of a roller mounted in the feed-opening for feeding cotton-seed into the chute and preventing the entrance of air through the feed-openings, said chute being provided with another opening and closed from the feed-opening to the second opening, a vibrating apron positioned between the feeding means and the opening in the chute, a throat positioned above said opening, a perforated cylinder receiving the cotton-seed from the chute, and means for causing a blast of air to pass from the opening in the chute, through the throat above and through the perforations of the cylinder.

4. In a cotton-seed cleaner, the combination with the chute, of means for feeding cotton-seed into the chute and preventing the entrance of air through the feed-opening, said chute being provided with an opening, a throat positioned above said opening, a perforated cylinder receiving within it the cotton-seed from the chute, mechanism within the cylinder for agitating the cotton-seed within the perforated cylinder, and means for causing a blast of air to pass from the opening in the chute, through the throat above and into and through the perforations of the cylinder.

5. In a cotton-seed cleaner, the combination with the chute, of means for feeding cotton-seed into the chute and preventing the entrance of air through the feed-opening, said chute being provided with an opening, a throat positioned above said opening, a perforated cylinder receiving within it the cotton-seed from the chute, mechanism within the cylinder for agitating and feeding forward the cotton-seed within the perforated cylinder, and means for causing a blast of air to pass from the opening in the chute, through the throat above and into and through the perforations of the cylinder.

6. In a cotton-seed cleaner, the combination with the chute, of means for feeding cotton-seed into the chute and preventing the entrance of air through the feed-opening, said chute being provided with an opening, a vibrating apron positioned between the feeding means and the opening in the chute, a throat positioned above said opening, a perforated cylinder receiving within it the cotton-seed from the chute, means for causing a blast of air to pass from the opening in the chute, through the throat above and through the perforations of the cylinder, and mechanism within the cylinder for agitating and feeding forward the cotton-seed within the perforated cylinder.

7. In a cotton-seed cleaner, the combination with the chute, of means for feeding cotton-seed into the chute and preventing the entrance of air through the feed-opening, said chute being provided with an opening, a throat positioned above said opening, a perforated cylinder receiving the cotton-seed from the chute, means for causing a blast of air to pass from the opening in the chute, through the throat above and through the perforated cylinder, and means for receiving the cotton-seed from the perforated cylinder and preventing the entrance of air at this point.

8. In a cotton-seed cleaner, the combination with the chute, of means for feeding cotton-seed into the chute and preventing the entrance of air through the feed-opening, said chute being provided with an opening, a throat positioned above said opening, a perforated cylinder receiving the cotton-seed from the chute, means for causing a blast of air to pass from the opening in the chute, through the throat above and through the perforated cylinder, and a roller provided with blades receiving the cotton-seed from the perforated cylinder.

9. In a cotton-cleaner, the combination with a feed-chute having an opening and closed from the feed-opening to said opening, and a throat positioned above said opening, of a roller provided with blades for feeding the cotton-seed to the chute and preventing the entrance of air through the feed-opening, means for agitating the cotton-seed positioned between the feeding means and the opening, and means for causing a blast of air to pass from the opening in the chute through the throat above.

10. In a cotton-cleaner, the combination with a feed-chute having an opening and closed between said opening and the feed-opening, and a throat positioned above the opening, of a roller for feeding cotton-seed to the chute, provided with blades, a vibrating apron positioned between the feeding-roller and the opening in the chute, and means for causing a blast of air to pass from the opening in the chute through the throat above.

11. In a cotton-seed cleaner, the combination with the feed-chute, of the roller provided with blades and mounted in the feed-chute, said chute being provided with an opening, an agitator mounted between the opening in the chute and the roller, a throat formed in the chute above the opening, a revolving perforated cylinder, to which the cotton-seed passes from the chute; means for agitating the cotton-seed within the revolving cylinder, means for causing a blast of air to pass from the opening in the chute through the perforated cylinder, and a roller provided with blades receiving the cotton-seed from the perforated cylinder.

12. In a cotton-seed cleaner, the combination with the perforated cylinder, of mechanism within the cylinder for agitating the cotton-seed therein, a blast entering the receiving end of the cylinder only and passing through the perforations, for drawing the fine particles from the cotton-seed through the perforations of the cylinder, and a roller provided with blades receiving the cotton-seed from the other end cylinder and preventing the entrance of air at that point; the passage-way from the delivery end of the cylinder to the roller being closed to the blast except through the perforations of the cylinder.

13. In a cotton-seed cleaner, the combination with a chute, provided with a feed-opening and a second opening and closed from its feed-opening to the second opening, of a throat positioned above the second opening, a perforated cylinder, means for causing a blast of air to pass up through the second opening, through the throat above and through the "perforations" in the cylinder, a roller provided with radial blades mounted in the feed-opening, and a slide mounted adjacent to the roller and adjustable to and from the same.

14. In a cotton-seed cleaner, the combination with a chute, of means for feeding the cotton-seed into the chute and preventing the entrance of air through the feed-opening, said chute being provided with a second opening, a vibrating apron mounted in the chute, a screen on the end of the vibrating apron and adjacent the second opening in the chute, a throat positioned above the screen and the second opening, and means for causing a blast up through the second opening and through the throat.

15. In a cotton-seed cleaner, the combination with a chute, of means for feeding cotton-seed into the chute and preventing the entrance of air through the feed-opening, said chute being provided with a second opening and closed from the feed-opening to the second opening, a throat positioned above the second opening, means for causing a blast to pass up through the second opening through the throat above, a vibrating apron positioned between the feeding means and the second opening, and means for adjusting the apron to and from the second opening.

16. In a cotton-seed cleaner, the combination with a chute, of means for feeding cotton-seed into the chute and preventing the entrance of air through the feed-opening, said chute being provided with a second opening and closed from the feed-opening to the second opening, a throat positioned above the second opening, means for causing a blast to pass up through the second opening through the throat above, a vibrating apron positioned between the feeding means and the second opening, and means for raising and lowering the end of the apron adjacent the second opening.

17. In a cotton-seed cleaner, the combination with a chute, of means for feeding cotton-seed into the chute and preventing the entrance of air through the feed-opening, said chute being provided with a second opening and closed from the feed-opening to the second opening, a throat positioned above the second opening, means for causing a blast to pass up through the second opening through the throat above, a vibrating apron positioned between the feeding means and the second opening, means for adjusting the apron to and from the second opening, and means for raising and lowering the end of the apron adjacent the second opening.

The foregoing specification signed this 23d day of April, 1903.

WILLIAM L. CROWSON.

In presence of—
JAMES B. COOK,
JHON C. BARNES.